(12) United States Patent
Beaudin et al.

(10) Patent No.: US 12,125,370 B2
(45) Date of Patent: Oct. 22, 2024

(54) METHOD AND SYSTEM FOR SYNCHRONIZING A VIEWER-EFFECT SIGNAL OF A MEDIA CONTENT WITH A MEDIA SIGNAL OF THE MEDIA CONTENT

(71) Applicant: D-BOX TECHNOLOGIES INC., Longueuil (CA)

(72) Inventors: André Beaudin, Longueuil (CA); Jean-François Menard, Boucherville (CA); Jean-François Charron, Longueuil (CA); Alexandre Loiseau, Longueuil (CA)

(73) Assignee: D-BOX TECHNOLOGIES INC., Longueuil (CA)

( * ) Notice: Subject to any disclaimer, the term of this patent is extended or adjusted under 35 U.S.C. 154(b) by 210 days.

(21) Appl. No.: 17/768,940

(22) PCT Filed: Oct. 19, 2020

(86) PCT No.: PCT/CA2020/051402
§ 371 (c)(1),
(2) Date: Apr. 14, 2022

(87) PCT Pub. No.: WO2021/072558
PCT Pub. Date: Apr. 22, 2021

(65) Prior Publication Data
US 2023/0274623 A1  Aug. 31, 2023

Related U.S. Application Data

(60) Provisional application No. 62/916,480, filed on Oct. 17, 2019.

(51) Int. Cl.
*G08B 6/00* (2006.01)
*H04R 1/02* (2006.01)
(Continued)

(52) U.S. Cl.
CPC .............. *G08B 6/00* (2013.01); *H04R 1/025* (2013.01); *H04R 1/406* (2013.01); *H04R 3/005* (2013.01);
(Continued)

(58) Field of Classification Search
None
See application file for complete search history.

(56) References Cited

U.S. PATENT DOCUMENTS 5,436,653 A * 7/1995 Ellis ..................... H04H 60/372
725/19
9,064,398 B2  6/2015  Davis et al.
(Continued)

FOREIGN PATENT DOCUMENTS

WO  2006113999 A1  11/2006
WO  2007072326 A2  6/2007
(Continued)

*Primary Examiner* — Hemant S Patel
(74) *Attorney, Agent, or Firm* — NORTON ROSE FULBRIGHT CANADA LLP

(57) ABSTRACT

There is described a method for synchronizing a viewer-effect signal of a media content with a media signal of the media content. The method generally has: capturing an audio portion of the media signal from a surrounding environment using a microphone; obtaining a fingerprint from the captured audio portion of the media signal; from reference fingerprints associated with reference time positions of at least a reference media content, identifying a time position of the media content corresponding to the obtained fingerprint; obtaining the viewer-effect signal associated with the identified time position of the media content; and outputting the viewer-effect signal synchronized with the media signal using the identified time position of the media content for producing an effect to a viewer in synchronization with the media signal of the media content.

20 Claims, 7 Drawing Sheets

(51) Int. Cl.
*H04R 1/40* (2006.01)
*H04R 3/00* (2006.01)

(52) U.S. Cl.
CPC .... *H04R 2201/401* (2013.01); *H04R 2430/01* (2013.01)

(56) References Cited

U.S. PATENT DOCUMENTS

| | | |
|---|---|---|
| 9,877,066 B2 | 1/2018 | Duong et al. |
| 10,469,977 B2 | 11/2019 | Menard et al. |
| 2004/0073422 A1* | 4/2004 | Simpson ................ G11B 27/28 381/94.1 |
| 2011/0295392 A1* | 12/2011 | Cunnington ........... G06Q 10/10 702/19 |
| 2012/0019352 A1 | 1/2012 | Menard et al. |
| 2014/0028914 A1 | 1/2014 | Polak et al. |
| 2016/0211934 A1 | 7/2016 | Lee |
| 2018/0365940 A1* | 12/2018 | Menard ............. H04N 21/8186 |
| 2019/0066460 A1 | 2/2019 | Ullrich |

FOREIGN PATENT DOCUMENTS

| | | |
|---|---|---|
| WO | 2009007874 A2 | 1/2009 |
| WO | 2010033387 A2 | 3/2010 |
| WO | 2012009785 A1 | 1/2012 |

\* cited by examiner

METHOD AND SYSTEM FOR SYNCHRONIZING A VIEWER-EFFECT SIGNAL OF A MEDIA CONTENT WITH A MEDIA SIGNAL OF THE MEDIA CONTENT

TECHNICAL FIELD

The present disclosure relates to the field of media recognition and synchronization. More particularly, this description relates to methods and devices for synchronizing a viewer-effect signal such as a haptic signal to video and audio stream media.

BACKGROUND

In controlling motion feedback systems for use in public, commercial or home environments, the challenge is in the synchronization of a haptic signal for gaming, feature length movies, amusement park rides, virtual reality, etc, with audio or video signals during playback, such that the haptic signal is delivered to motion feedback systems in time for the platform movement to match the reproduced audio-visual signals. The required accuracy may be in the order of milliseconds.

In some applications, the haptic signal is not transmitted synchronously with audio or video signals; the playback device must retrieve the haptic signal separately, and synchronize it for playback with the audio or video signals. In some instances, the audio signal of a media may only be available as part of ambient sound, as an output from loudspeakers. For example, the ambient sound may come from mono audio set-ups, stereophonic set-ups, or multi-channel surround sound audio, such as 5.1 surround sound or 7.1. surround sound. This may cause issues in identifying the media, due to factors such as reverberation, parasitic noise, unknown sound level, distortion, echo, variability of sound as a function of location of sound capture, as a function of the number of audio channels being used, and/or as a function of which one of the language tracks of the media is being played.

There is therefore a need for an improved synchronization method and device which addresses the above-noted challenges.

SUMMARY

In accordance with a first aspect of the present disclosure, there is provided a system for synchronizing a viewer-effect signal of a media content with a media signal of the media content, the system comprising: at least one microphone capturing an audio portion of the media signal from a surrounding environment; a controller communicatively coupled to the at least one microphone, the controller having a processor and a non-transitory memory having stored thereon instructions that when executed by the processor perform the steps of: obtaining a fingerprint from the captured audio portion of the media signal; from reference fingerprints associated with reference time positions of a reference media content, identifying a time position of the media content corresponding to the obtained fingerprint; obtaining the viewer-effect signal associated with the identified time position of the media content; and outputting the viewer-effect signal synchronized with the media signal using the identified time position of the media content usable for producing an effect for a viewer synchronized with the media signal.

Further in accordance with the first aspect of the present disclosure, the at least one microphone can for example be made integral to a viewer seat.

Still further in accordance with the first aspect of the present disclosure, the at least one microphone can for example include a plurality of microphones capturing different audio portions of the media signal.

Still further in accordance with the first aspect of the present disclosure, the plurality of microphones can for example be distributed within the surrounding environment.

Still further in accordance with the first aspect of the present disclosure, the steps of obtaining, identifying and obtaining can for example be performed for each of the captured audio portions of the media signal.

Still further in accordance with the first aspect of the present disclosure, the reference fingerprints can for example be stored on a remote database and accessible by the controller during the identifying.

Still further in accordance with the first aspect of the present disclosure, the obtaining the viewer-effect signal can for example comprise retrieving the viewer-effect signal from the remote database.

Still further in accordance with the first aspect of the present disclosure, the controller can for example have a gain control module applying a given gain to the captured audio portion prior to the identifying.

Still further in accordance with the first aspect of the present disclosure, the gain control module can for example reduce the given gain when the peak amplitude is above a saturation threshold, increase the given gain when the peak amplitude is below a detectable sound threshold, and maintain the given gain when the peak amplitude is above the detectable sound threshold and below the saturation threshold.

Still further in accordance with the first aspect of the present disclosure, the system can for example further include a viewer-effect producing device communicatively coupled to the controller, the viewer-effect producing device producing an effect for a viewer based on the outputted viewer-effect signal synchronized with the media signal.

Still further in accordance with the first aspect of the present disclosure, the viewer-effect producing device can for example be a motion feedback device, the viewer-effect signal can for example correspond to a haptic signal.

In accordance with a second aspect of the present disclosure, there is provided a method for synchronizing a viewer-effect signal of a media content with a media signal of the media content, the viewer-effect signal for producing an effect for a viewer, the method comprising: capturing an audio portion of the media signal from a surrounding environment using at least one microphone; obtaining a fingerprint from the captured audio portion of the media signal; from reference fingerprints associated with reference time positions of at least a reference media content, identifying a time position of the media content corresponding to the obtained fingerprint; obtaining the viewer-effect signal associated with the identified time position of the media content; and outputting the viewer-effect signal synchronized with the media signal using the identified time position of the media content for producing the effect in synchronization with the media signal of the media content.

Further in accordance with the second aspect of the present disclosure, the system can for example further comprise producing the effect in synchronization with the media signal of the media content based on the outputted viewer-effect signal synchronized with the media signal.

Still further in accordance with the second aspect of the present disclosure, the viewer-effect signal can for example be a haptic signal, the producing can for example comprise activating one or more actuators of a motion feedback device in accordance with the haptic signal.

Still further in accordance with the second aspect of the present disclosure, the method can for example further comprise receiving an identity of the media content, the reference fingerprints being associated with the identity of the media content.

Still further in accordance with the second aspect of the present disclosure, the capturing can for example comprise capturing a plurality of audio portions of the media signal, the steps of obtaining, identifying and obtaining being performed for each of the captured audio portions of the media signal.

Still further in accordance with the second aspect of the present disclosure, the reference fingerprints can for example be stored on a remote database, the identifying can for example comprise accessing the reference fingerprints from the remote database.

Still further in accordance with the second aspect of the present disclosure, the obtaining the viewer-effect signal can for example comprise retrieving the viewer-effect signal from the remote database.

Still further in accordance with the second aspect of the present disclosure, the obtaining the fingerprint can for example comprise applying a given gain to the captured audio portion prior to the identifying, the gain can for example be dependent upon the peak amplitude.

Still further in accordance with the second aspect of the present disclosure, the gain can for example reduce when the peak amplitude is above a saturation threshold, increase the given gain when the peak amplitude is below a detectable sound threshold, and maintain the given gain when the peak amplitude is above the detectable sound threshold and below the saturation threshold.

In accordance with a third aspect of the present disclosure, there is provided a system for determining if a viewer-effect signal of a media content is synchronized to a media signal of the media content, the system comprising: a viewer-effect producing device producing an effect for a viewer based on the viewer-effect signal; at least one microphone capturing an audio portion of the media signal from a surrounding environment; and a controller communicatively coupled to the viewer-effect producing device and the at least one microphone, the controller having a processor and a non-transitory memory having stored thereon instructions that when executed by the processor perform the steps of: obtaining a fingerprint of the captured audio portion of the media signal; retrieving a reference fingerprint of the media signal at a reference time position of the media content based on a current time position of the viewer-effect signal; comparing the obtained fingerprint and the reference fingerprint to one another; based on the comparing, determining if the viewer-effect signal is synchronized to the media signal; and according to the determining, outputting the viewer-effect signal synchronized with the media signal for producing the effect in synchronization with the media content using the viewer-effect producing device.

Further in accordance with the third aspect of the present disclosure, the system can for example further comprise, upon determining that the viewer-effect signal is not synchronized to the media signal, stopping the outputting the viewer-effect signal.

Still further in accordance with the third aspect of the present disclosure, the system can for example further comprise, prior to the stopping, maintaining the outputting for a given asynchronization delay.

Still further in accordance with the third aspect of the present disclosure, the given asynchronization delay can for example be at least one of null and ranging between about 1 s and 1 min.

Still further in accordance with the third aspect of the present disclosure, the system can for example further comprise receiving acceptable asynchronization delay data associated to the media content, the acceptable asynchronization delay data including a plurality of acceptable asynchronization delay values associated with corresponding ones of the reference time positions of the media content, and determining the given asynchronization delay based on the receiving acceptable asynchronization delay data and the reference time position of the media content.

Still further in accordance with the third aspect of the present disclosure, the system can for example further comprise receiving synchronization confidence data associated to the media content, the synchronization confidence data including where plurality of synchronization confidence values associated with corresponding ones of the reference time positions of the media content, and determining the given asynchronization delay based on the synchronization confidence data and the reference time position of the media content.

Still further in accordance with the third aspect of the present disclosure, the at least one microphone can for example be made integral to a viewer seat.

Still further in accordance with the third aspect of the present disclosure, the controller can for example have a gain control module applying a given gain to the captured audio portion prior to the retrieving.

Still further in accordance with the third aspect of the present disclosure, the system can for example further include a viewer-effect producing device communicatively coupled to the controller, the viewer-effect producing device producing an effect for a viewer based on the outputted viewer-effect signal synchronized with the media signal.

Still further in accordance with the third aspect of the present disclosure, the viewer-effect producing device can for example be a motion feedback device, the viewer-effect signal corresponding to a haptic signal.

In accordance with a fourth aspect of the present disclosure, there is provided a method for determining if a viewer-effect signal of a media content is synchronized to a media signal of the media content, the method comprising: producing an effect for a viewer based on the viewer-effect signal; capturing an audio portion of the media signal from a surrounding environment; obtaining a fingerprint of the captured audio portion of the media signal; retrieving a reference fingerprint of the media signal at a reference time position of the media content based on a current time position of the viewer-effect signal; comparing the obtained fingerprint and the reference fingerprint to one another; based on the comparing, determining if the viewer-effect signal is synchronized to the media signal; and according to the determining, outputting the viewer-effect signal synchronized with the media signal for producing the effect in synchronization with the media content using the viewer-effect producing device.

Further in accordance with the fourth aspect of the present disclosure, the method can for example further comprise, upon determining that the viewer-effect signal is not synchronized to the media signal, stopping the outputting the viewer-effect signal.

Still further in accordance with the fourth aspect of the present disclosure, the method can for example further comprise, prior to the stopping, maintaining the outputting for a given asynchronization delay.

Still further in accordance with the fourth aspect of the present disclosure, the given asynchronization delay can for example have at least one of null and ranging between about 1 s and 1 min.

Still further in accordance with the fourth aspect of the present disclosure, the method can for example further comprise receiving acceptable asynchronization delay data associated to the media content, the acceptable asynchronization delay data including a plurality of acceptable asynchronization delay values associated with corresponding ones of the reference time positions of the media content, and determining the given asynchronization delay based on the receiving acceptable asynchronization delay data and the reference time position of the media content.

Still further in accordance with the fourth aspect of the present disclosure, the method can for example further comprise receiving synchronization confidence data associated to the media content, the synchronization confidence data including where plurality of synchronization confidence values associated with corresponding ones of the reference time positions of the media content, and determining the given asynchronization delay based on the synchronization confidence data and the reference time position of the media content.

Still further in accordance with the fourth aspect of the present disclosure, the capturing can for example further comprise capturing a plurality of audio portions of the media signal, the steps of obtaining, retrieving and comparing being performed for each of the captured audio portions of the media signal.

Still further in accordance with the fourth aspect of the present disclosure, the obtaining the fingerprint can for example further comprise applying a given gain to the captured audio portion prior to the identifying, the given gain being dependent upon the peak amplitude.

Still further in accordance with the fourth aspect of the present disclosure, the given gain can for example reduce when the peak amplitude is above a saturation threshold, increases the given gain when the peak amplitude is below a detectable sound threshold, and maintains the given gain when the peak amplitude is above the detectable sound threshold and below the saturation threshold.

Still further in accordance with the fourth aspect of the present disclosure, the viewer-effect signal can for example be a haptic signal, the producing comprises activating one or more actuators of a motion feedback device in accordance with the haptic signal.

Motion feedback systems are meant to include motion platforms, motion actuator(s), motion simulator, vibrotactile transducers, and inertial shakers.

Motion platforms are meant to include any platform or seating arrangement to which motion is induced by actuators and on which a person is installed. Motion platform applications include, but are not limited to, gaming, feature length movies, amusement park rides, virtual reality, music with or without video, etc. An example of a motion platform include seat or chair for one or more persons on which are mounted one or more actuators which interface with the ground or with a structure. Another example would be a platform for receiving a seat, chair or other device accommodating a user, and on which are mounted one or more actuators which interface with the ground. Another example would be a shaker device producing vibrations in a device (e.g., chair, seat, etc).

Motion codes, a motion code signal or a motion code stream contain motion effects, or like viewer-effect signals contain other viewer-effects such as subtitles, alternative languages, audio track for deaf people, or people with hearing impairment, based on the content meant to be reproduced to the viewer. In most cases, the haptic signals are prepared by motion designers. In other cases, the haptic signals or portion thereof are generated automatically.

A media signal is to be understood as comprising an audio signal, a video signal, a haptic signal, an augmented reality signal, a virtual reality signal, a three-dimensional hologram signal and the like. For example, a media signal may cause vibrations of a device, which vibrations may be captured for synchronization.

An audio signal or an audio stream is to be understood as encompassing sound information meant to be reproduced during the presentation, such as the sound track of games, feature length movies, amusement park rides, virtual reality environments, standalone music, music video(s), etc. As an example, the audio signal is in the form of encoded Pulse Code Modulation (PCM) samples.

A video signal or a video stream is to be understood as encompassing visual information meant to be reproduced to the user, such as the main picture of games, feature length movies, amusement park rides, virtual reality environments, etc. An example of a video signal or a video signal is an MPEG-4 Part 10 video elementary stream.

Media content is meant to include games, feature length movies, amusement park rides, virtual reality environments, advertisements, music, etc.

Feature length movies are those intended to be shown in movie theaters or home theaters. They last generally more than 30 minutes and have separate video and audio tracks to which a haptic signal, a stream of motion codes or a motion code track, can be associated.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
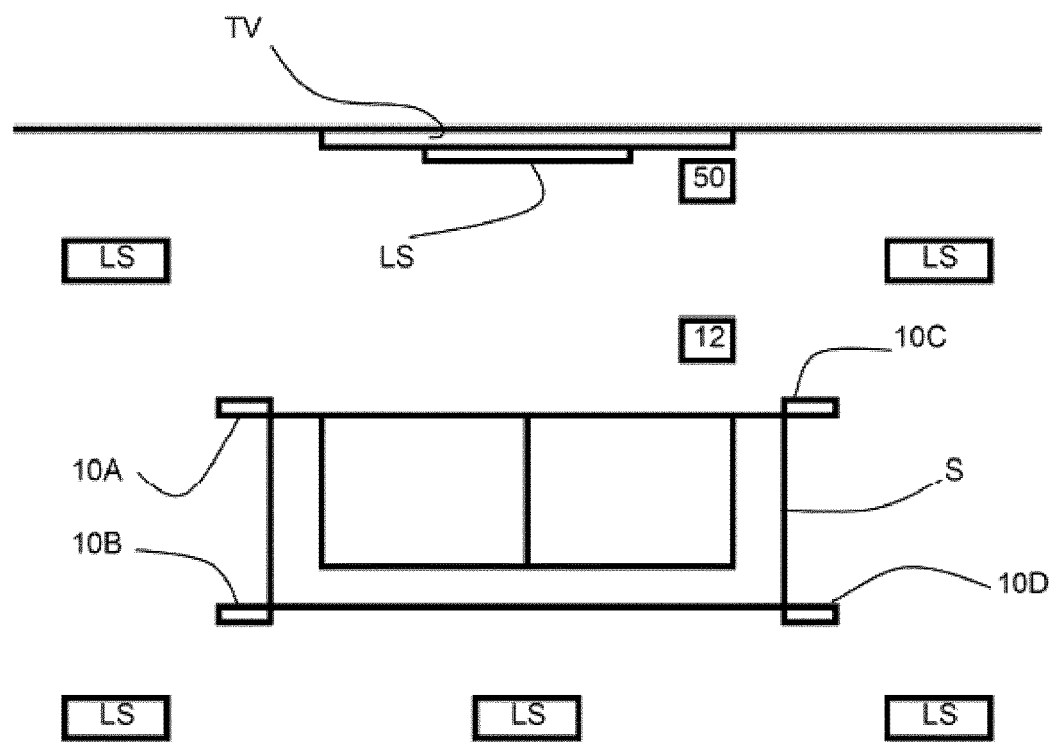
FIG. 1 is a schematic view of a surround sound set-up with a system for synchronizing a viewer-effect signal of a media content with a media signal of the media content, in accordance with an embodiment of the present disclosure.

Referring now to the drawings, and more particularly to FIG. 1, an exemplary audio-visual set-up is shown, by which a user or users can watch and listen to a media having concurrent synchronized video and audio outputs. The audio-visual set-up can also be used to play music or other types of sounds without any video output, in some embodiments. In FIG. 1, the set-up may be a domestic or small scale one, featuring a single seat S, whether it be for a single or multiple occupants. The set-up of FIG. 1 is shown as an example, with the method 20 and device 50 described herein being available for use in larger scale set-ups, including theaters, show venues, auditoriums, etc, to name a few examples. This may include more than one seat S. Accordingly, reference is made herein to seat, seat(s) or seats, but unless stated otherwise, the synchronization concepts described herein may be applied to set-ups of a single or multiple seats, among other items, such as shakers, and/or set-ups having any other suitable haptic device types such as haptic vests, haptic shoes, haptic gloves, haptic wrist bands or watches, and haptic helmets.

In the set-up, the seat S faces a screen TV, such as a television, a tablet or like portable device, a projector display, VR helmet, etc, i.e., a video output. The seat S may be surrounded by loudspeakers LS (also known as speakers, including for example a subwoofer). The audio signal sent to the loudspeakers LS may come from any appropriate equipment, such as a home theater receiver, an amplifier, a television, a media streamer, a player (DVD, Blu-Ray®), etc. The loudspeakers LS may also be integrated to the screen TV (e.g., television speakers). Accordingly, the occupant(s) of the seat(s) S are exposed to a surround sound from the speakers LS, in synchronization with the video being displayed on screen TV.

The seat(s) S is equipped or accessorized with a motion feedback system 10 (FIG. 4) having actuators 1 to N, shown in this example as 10A, 10B, 10C, 10D. The motion feedback system imparts vibro-kinetic movements to the seat(s) S, as a function of the media being watched on the A/V set-up. There may be fewer or more actuators for the seat S, with a single actuator being an option, as well as passive joints (e.g., spherical joints) to interface the seat S to a structure or to the ground. The actuators 10A-10N may be linear actuators (e.g., electro-mechanical actuators), such as those described in U.S. Pat. Nos. 9,664,267, 9,863,513, 10,012,295, incorporated herein by reference. The actuators may also pneumatic or hydraulic cylinders, shakers, as other possibilities.

The motion feedback system 10 is controlled by the device 50. The device 50 sends signals to the actuators 10A-10N for the actuators 10A-10N to produce a vibro-kinetic output, vibrations and/or any other motion output. The vibro-kinetic output/motion output may not be a vibration derived from the sound track, but may be for example an encoded haptic signal (motion code) that may bring texture to the movement of the platform supported by the actuators 10A-10N. The concurrent effect of the actuators 10A-10N results in the vibro-kinetic movements and/or vibrations of the seat(s) S. As mentioned above, other types of viewer-effect signals may be produced, which may entail the presence of other types of viewer-effect producing devices, such as Hue-type lamps producing light, wind blowing apparatuses, closed captioning devices, etc.

Figure 1A:
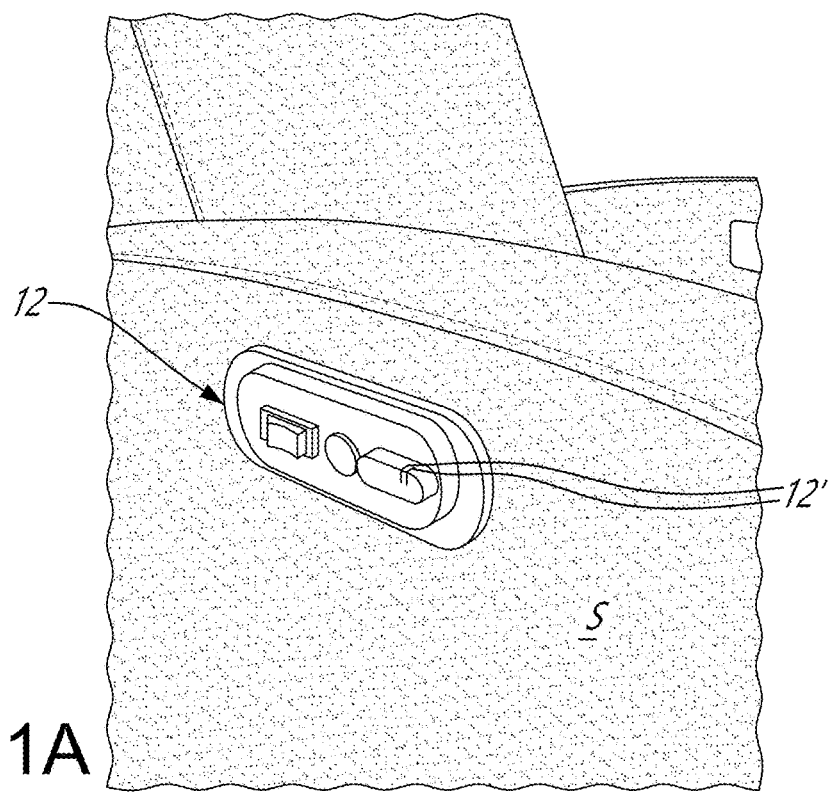
FIG. 1A is an oblique view of an example of a microphone made integral to a viewer seat of the set-up of FIG. 1, in accordance with an embodiment.
Figure 1B:
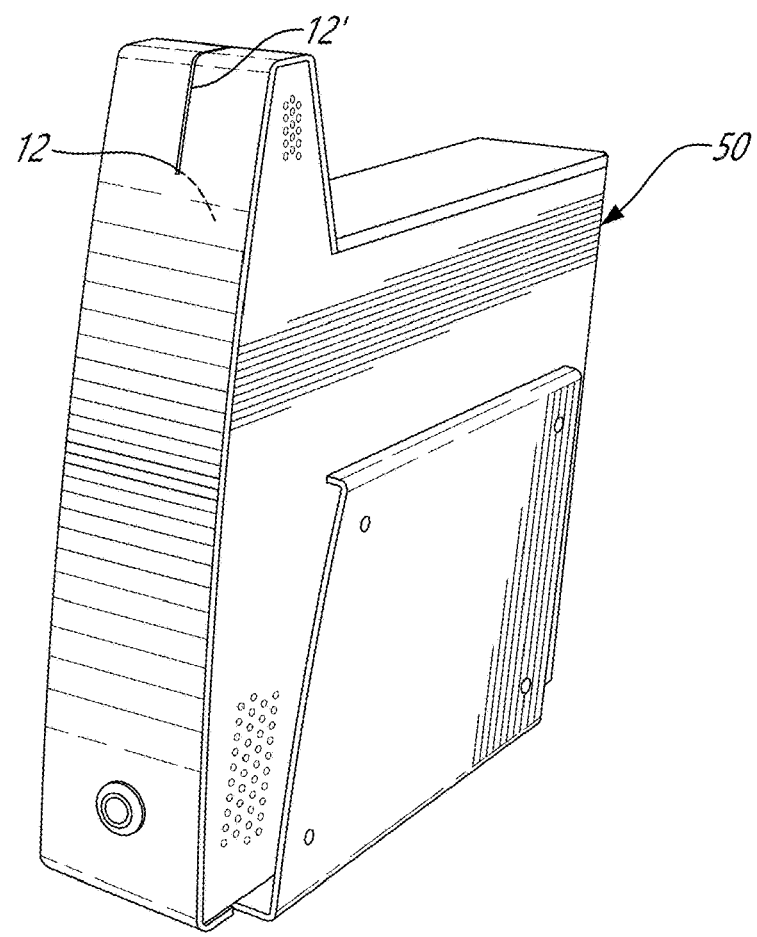
FIG. 1B is an oblique view of an example of a standalone microphone of the set-up of FIG. 1, in accordance with an embodiment.

In order to synchronize the vibro-kinetic movements of the seat(s) S with the AV output (e.g., sound track, images) of the screen TV and/or loudspeakers LS, a microphone(s) 12 or like sound capture device is connected to the device 50. The microphone 12 may be any appropriate type of sound capture device that captures ambient sound, including the audio output from the loudspeakers LS and/or the screen TV. In some embodiments, the microphone 12 can be made integral to a viewer seat S, such as shown in FIG. 1A. Additionally or alternatively, the microphone(s) 12 can be part of a standalone device 50 such as shown in FIG. 1B. The standalone device 50 can be positioned besides a viewer seat or anywhere within an environment of the audio-visual set-up. In these embodiments, the microphone(s) 12 may have microphone opening(s) 12' facing towards the audio-visual set-up. In some embodiments, such as when the standalone device 50 is not facing the audio-visual set-up, the audio portion captured by the microphone(s) may or may not be ideal. Accordingly, the captured audio portion can be processed based on the positioning of the viewer seat S and/or of the standalone device 50 within their respective surrounding environments, for example. As an alternative to the microphone, the device 50 may receive the audio track as a line-in signal. As another embodiment, the device 50 has an optical capture device that captures images and can produce a signature based on the color content of an image displayed on the screen TV.

Figure 2:
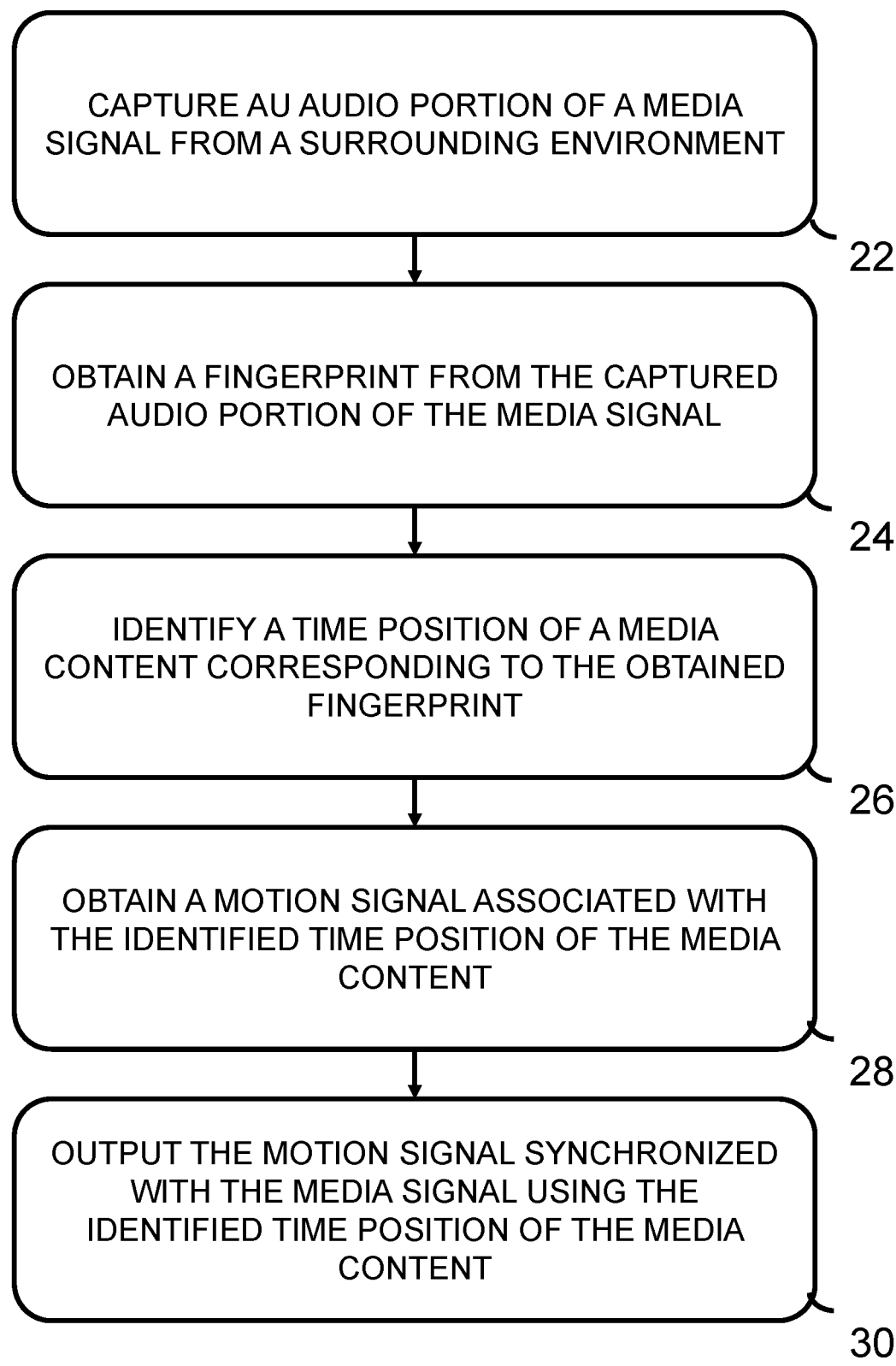
FIG. 2 is a flowchart of a method for synchronizing a haptic signal to an audio signal, in accordance with an embodiment.

Referring to FIG. 2, a method 20 for synchronizing a viewer-effect signal, such as a haptic signal corresponding to a media content, for example from a feature length movie or amusement park rides, with a media signal for the media content displayed in a set-up such as the one of FIG. 1. For simplicity, reference may be made herein to haptic signal, though this may include other types of viewer-effect signal. Thus, even though reference may be made to haptic signal herein, the concepts may apply to other types of viewer-effect signals unless stated otherwise. The haptic signal is for controlling the motion feedback system 10. The viewer-effect signal may be continuous and may also be subtitles or other visual signals, additional audio tracks such as a track of alternative language, an audio track for the visual impaired by which an additional narrative is added to provide context (e.g., "car is arriving"), track for deaf people, or people with hearing impairment, such as subtitles, sign language, or written narrative describing a sound (e.g., "explosion sound"), the use of other devices such as Hue-type lamps, steam generators, to emulate elements such as lightning, fog, or track with audio commentary including actors' and/or director's commentary. According to an embodiment, the media signal is an audio signal from the loudspeakers LS and/or a video signal. For simplicity, the methods described herein will refer to haptic signal. However, all methods also apply to other types of viewer-effect signals such as those listed above, not only haptic signal.

As a starting point, for each media content for which a viewer-effect or motion track or signal has been created, a signal track, also referred to as a metadata track, has been previously created for the duration of the audio track of the media content. The metadata track gives each time interval a quantitative indication of the power of the audio or any other feature to assess the intensity, which should be received if the audio was at its optimum volume, for subsequent timely synchronization. Other types of information may be used to allow the estimation of the expected intensity value at enough time intervals to permit timely synchronization. The metadata track could also include other types of signals or information. For example, the metadata track can describe the signal as having a pattern repeating locally or at specific time positions in the movie, making the synchronization more or less difficult depending on the time position. The viewer-effect track/motion track, the metadata track for the media content are correlated and stored, along with a fingerprint representing the audio track and/or visual track of the media content.

In step 22, an audio portion of the media signal is captured from a surrounding environment. For example, the media signal is received from microphone(s) 12, for instance in addition to ambient sound. Consequently, depending on the set-up, the captured audio may include a plurality of different audio portions. Each of the audio portions may be captured using a respective one of a number of microphone(s) distributed within the surrounding environment of the audio-visual set-up, though it is considered to use a single microphone 12 in spite of the ambient sound created by a plurality of devices in a multi-channel set up. In some embodiments, each of the captured audio portions can correspond to a combination of the audio channels as heard by corresponding any one of the microphones. In other words, the microphones can capture the audio from different physical locations in the room allowing for a subsequent separation of the audio channels of the media content. For instance, eight microphones may be used to capture audio portions incoming from six different loudspeakers, and to resolve the six channels based on the eight captured audio portions. The configuration of the room in which the microphones are positioned can influence the audio portions that are captured by the microphones. For instance, in an embodiment, a room may have a number of loudspeakers and one or more microphones. In this embodiment, the audio portions captured by the microphone(s), which include direct sound and reflected sound, can be mathematically processed to collectively retrieve the audio channels incoming from any given one of the loudspeakers. In this way, one can associate sound signatures to different locations in the room, which can therefore facilitate noise removal in some embodiments.

In step 24, a fingerprint (also known as signature) corresponding to the received audio portion of the media signal is obtained. According to an embodiment, the step of obtaining a fingerprint corresponding to the received portion of the media signal (step 24) comprises computing the fingerprint of the received portion of the media signal, so as to extract a sequence of features characterizing the audio signal over time.

In one embodiment, to address issues related to the ambient sound, the audio gain from the captured sound or from the hardware including the microphone(s) is adjusted to make the input sound level optimal.

In step 24, with the haptic signal not yet synchronized with the media content, the audio gain from the captured audio is systematically reduced if there is saturation of the captured signal. Still without synchronization, the audio gain is gradually increased if the audio level is insufficient, until a threshold deemed sufficient is reached. The reduction of the audio gain and subsequent gradual increase may be referred to as Automatic Gain Control (AGC). The AGC may be performed by a gain control module applying the audio gain to the captured audio portion prior to any further step of method 20. In some embodiments, the gain control module can reduce the audio gain when the peak amplitude is above a saturation threshold. The gain control module can increase the audio gain when the peak amplitude is below a detectable sound threshold. Otherwise, the gain control module can maintain a given audio gain when the peak amplitude of the captured audio portion is above the detectable sound threshold and below the saturation threshold, for instance. It is intended that the given audio gain can be applied simultaneously to all the microphones in some embodiments. In some other embodiments, the audio gain module can apply independent audio gains to different ones of the microphones, thereby compensating for microphones which may need more or less audio gain, depending on their respective positions in the room.

In the computing the fingerprint step, the fingerprint of the portion of media signal may be generated as a code that uniquely corresponds to a waveform of the media signal. Upon generating such a unique code (i.e., a coded identifier), the corresponding waveform of the media signal from which the fingerprint was generated is thereafter identifiable by referencing to its fingerprint as described herein.

The fingerprint obtained in step 24 may thus be a sequence of features, for instance in the form of sampled time-domain audio source representation or a subset of it, a frequency-domain representation or a subset of it, or any transformation of the aforementioned signals or any combination of these signals, their subsets or their transformed subsets. For example, the envelope of the root mean square (RMS) value of the time-domain signal, which represents the instantaneous power of the audio, may be used to make up the fingerprint.

In step 26, from reference fingerprints associated with reference time positions of at least one reference media content accessible in a database or cloud-based, a time position of the media content corresponding to the obtained fingerprint is identified.

More specifically, in one embodiment of step 26, a database (a.k.a., a storage medium) of coded identifiers for the fingerprints for the media signal at the multiple playback time positions is consulted. The fingerprint of the portion of the media signal is matched to a reference fingerprint associated to the reference time position within the media content. According to an embodiment, the identifying a time position of the media content (step 26) takes place on a remote networked server (not shown).

According to an embodiment, method 20 can include a step of receiving the identity of one reference media content of the at least one reference media content to which the media signal corresponds prior to the identifying a time position of the media content (step 26). For example, the identity may be received as entered by a user of the set-up of FIG. 1. In such a case, the step of identifying the time position of the media content of 26 is performed using reference fingerprints associated with reference time positions of the identified reference media content. In some embodiments, the identity of the reference media content may be absent. In these embodiments, the captured fingerprint can be compared to reference fingerprints pertaining to a number of different reference media content identities.

Method 20 may further comprise receiving at least one reference fingerprint associated with the outputted haptic signal and stopping the output of the haptic signal when the obtained fingerprint does not match any of the at least one reference fingerprint. It may also include improving and updating the metadata.

In another embodiment of step 24, the obtaining the fingerprint comprises retrieving the coded identifier for the fingerprint of the portion of the media signal at the identified time position directly from the haptic signal.

In step 28, a viewer-effect signal such as the haptic signal associated with the identified time position of the media content is obtained. According to an embodiment, the haptic signal associated with the identified time position of the media content is obtained from a remote network server (not shown).

According to an embodiment of step 28, the identifying the current playback time position comprises continuously performing the obtaining a fingerprint, the identifying a time position, and the obtaining the haptic signal steps to keep outputting the haptic signal synchronized with the media signal, thereby ensuring continuous synchronization of the haptic signal.

According to another embodiment of step 28, the identifying the current playback time position comprises performing the obtaining a fingerprint, the identifying a time position, and the obtaining the haptic signal at a given frequency to resynchronize the outputting the haptic signal with the media signal. These steps may also be performed for each of the captured audio portions in case more than one microphone is used to capture the audio portions of the media content.

The identified time position refers to the location of the media signal within the at least one media content which is identified as corresponding to media content which is currently being played (corresponding to the obtained fingerprint) on either one of the speakers (for audio), the screen or display (for video) and the motion feedback system (for motion).

Step 30 involves outputting the haptic signal, using the identified time position of the media content, synchronized with the media signal. The haptic signal is eventually sent to the motion feedback system 10 (FIG. 4) having actuators 10A-10N for moving the seat(s) S according to the haptic signal. The viewer-effect signal is sent to the appropriate apparatus for playback. This may include a portable device (e.g., smart phone, tablet, dedicated audio device, seat monitor) that displays the additional written data (e.g., for the hearing impaired) or outputs the additional audio data (e.g., for the visually impaired). This applies to any viewer-effect signal described herein.

According to an embodiment, method 20 further comprises receiving a haptic signal corresponding to the media content prior to the identifying a time position of the media content (step 26), wherein the reference fingerprints are retrieved directly from the received haptic signal.

According to an embodiment, the synchronized haptic signal is stored in a storage device such as in a buffered manner for eventually being sent to the motion feedback system 10.

The method 20 is performed, in one example, in real-time, as the media signal is being played, and the audio is being captured for example with the microphone(s) 12.

Still according to another embodiment, method 20 may also include receiving at least one reference fingerprint associated with the outputted haptic signal and stopping the output of the haptic signal when the obtained fingerprint does not match any of the at least one reference fingerprint in spite of the processing of step 24.

Figure 3:
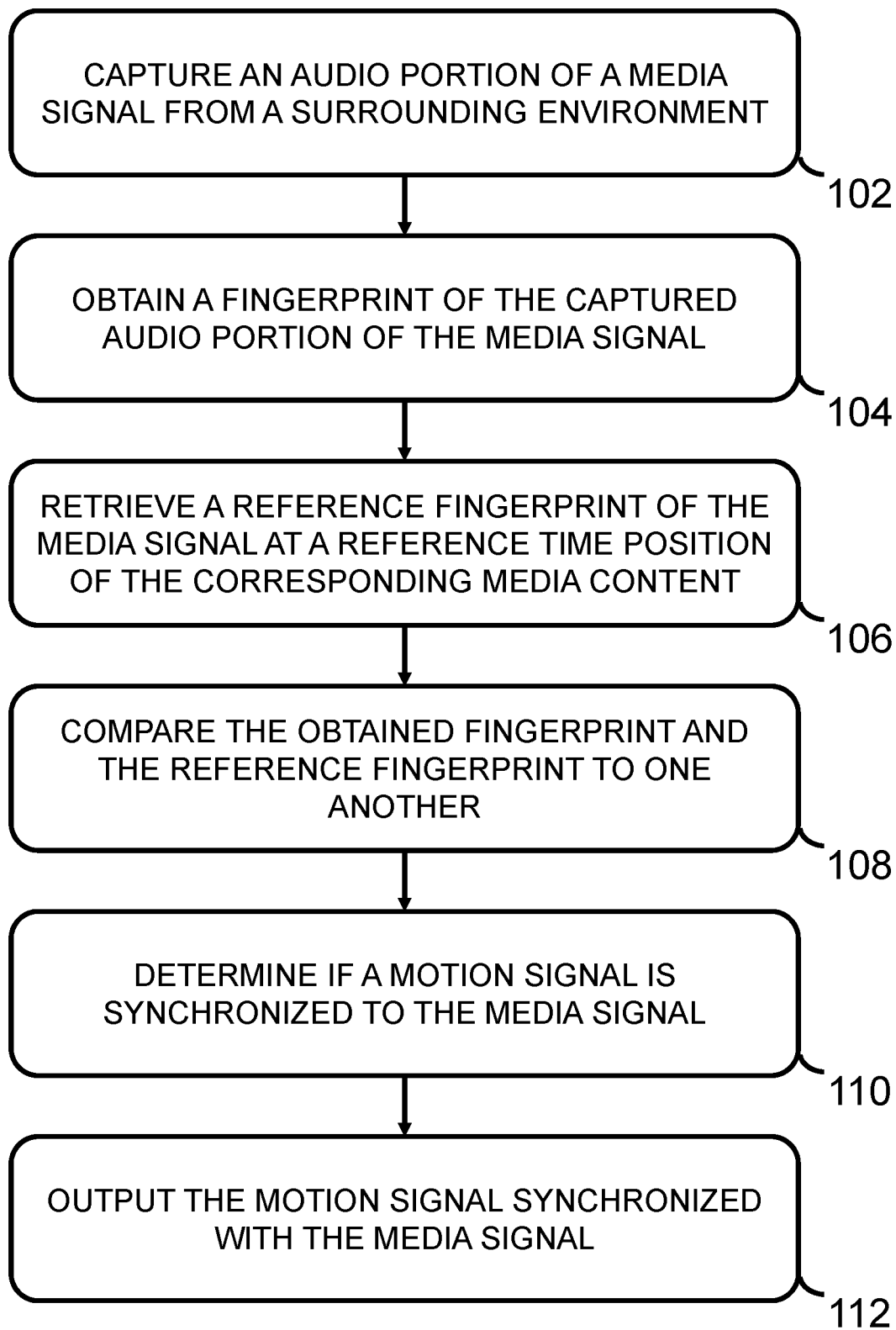
FIG. 3 is a flowchart which illustrates an embodiment of a method for determining if a haptic signal corresponding to a media content is synchronized to a media signal for the media content.

FIG. 3 illustrates an embodiment of a method 100 for determining if a haptic signal corresponding to a media content is synchronized to a media signal for the media content. The method 100 may occur after the initial synchronization using method 20 of FIG. 2.

In step 102, an audio portion of the media signal is captured for instance with the microphone(s) 12. In step 104, based on the captured audio portion of the media signal, a fingerprint of the media signal for the current playback time position is obtained (i.e., an obtained fingerprint).

The fingerprint of the media signal may include additional information, such as the metadata track. The metadata track may be used to further process the audio capture for subsequent fingerprint generation.

The sequence of features of the audio capture and a corresponding sequence of features from the reference audio track may be compared over time to produce a distance estimation indicating how different the features are over time. This comparison of information of the features distance over time may be used to modify the captured audio in such a way that the features distance will be reduced.

The modification of the captured audio could be, in one embodiment, an adjustable scalar gain. In this case, an automatic gain control module could be performed, for instance by taking into account the knowledge on the expected volume of the audio capture inferred from the volume of the reference audio track at the same time. As another form, the modification of the captured audio could involve implementing a transfer function cancelling the modifications that were applied to the original audio signal by being captured by the microphone(s) 12 or by a playback device response. As an example, an adaptive filter could model the inverse of the acoustic response of the room where microphones 12 are capturing the audio. In some embodiments, the acoustic response of the room may be determined by playing a reference audio track within the room and by capturing the resulting audio signal(s) using the microphone(s) 12. By comparing the captured audio signal(s) and the reference audio track to one another, the acoustic response of the room may be determined. Once determined, the acoustic response of the room can be used to modify any subsequently captured audio signal accordingly, which may ease the identification of the corresponding fingerprint. Otherwise, the reference fingerprints may also be modified according to the acoustic response of the room in some other embodiments. For instance, based on a knowledge of the playing audio track and on a knowledge of the audio response of the room, the noise of the captured audio portion may be identified, and possibly subsequently subtracted, by comparing the captured audio portion and an expected version of the captured audio portion. It is noted that the acoustic response of the room may depend on a type of sound rendered by the audio-visual set-up. For instance, the acoustic response of the room may take into consideration whether sound is produced according to stereo sound or surround sound. In embodiments where different audio tracks are used for a center channel, a left channel and a right channel of the audio-visual set-up, the microphone(s) may be positioned to advantageously optimize the amount of captured sound incoming from the center channel. In some other embodiments, the microphone(s) may be positioned to optimize the amount of captured sound incoming from the left and right channels, thereby minimizing the impact of language-related fingerprints (generally carried by the center channel) which can be difficult to synchronize, especially when more than one language track is available.

As another possibility, audio processing could be implemented just before the Feature Extraction function in the Reference Audio Track processing path. This module would implement an acoustic model of the room so the Feature Extraction on both sides (Reference Audio and Captured Audio) would yield a feature distance relatively unaffected by the room's acoustics. In some embodiments, the acoustic model of the room may take into consideration a constrained location, such as a room incorporating a number of physical elements causing acoustic wave reflection, such as walls, pieces of furniture or people. The acoustic model can be representative of an open area in some other embodiments.

The processing applied to the audio capture channel(s) can also provide an estimate of the acoustic audio level in relation to the expected audio level. More precisely, the information stemming from the Feature Distance estimation allows to assess if the hardware audio gain in the captured audio (e.g., microphone(s) 12) is optimal. For instance, if the current hardware gain is such that the available dynamic range of the hardware chain is under-utilized, knowledge of the current audio level with respect to the optimal level allows an adjustment of the hardware gain so the audio will use an optimal portion of the dynamic range of the audio hardware.

In the specific case where the audio is captured with a microphone(s) 12, the audio processing having prior knowledge of the information contained in the audio signal has the capacity to segregate at least partially the portion in the audio capture that comes from the media playback from the portion that is not. This latter portion may be from other noise sources present in the room and most often may come from different locations in the microphone(s) capture range.

In the case of one or more microphones 12, the discrimination between the expected audio (the media playback) and other sources may be by means of the different reflection patterns in the room since the sound sources for the media playback will typically be at different locations than the acoustic noise sources in the capture ranges of the microphone(s) 12.

In the case when more than one microphone 12 captures the audio, the audio processing will have the capacity of tuning the microphone inputs gain and phase in a fashion to increase the sensitivity in the direction(s) of the media audio source(s) and decrease the sensitivity in the direction(s) of the noise source(s), in effect implementing beamforming. For instance, in some embodiments, the microphone(s) may be positioned at different places within the room in order to find optimal location(s) of the microphone(s). When positioned at an optimal position, a microphone may pick up a lesser amount of noise, which may reduce the amount of processing, such as audio gain modification, that has to be performed in real time to perform the method 20.

In step 106, a reference fingerprint of the portion of the media signal at a time position of the media content is retrieved based on the current position within the viewer-effect signal.

In step 108, the reference fingerprint of step 106 is compared with the obtained fingerprint of step 104. In step 110, based on the comparing, it is determined that the haptic signal is synchronized to the media signal if the two fingerprints are similar to one another. Otherwise, it is determined that the two fingerprints differ from one another, the haptic signal and media signal are not synchronized. This can occur, for instance, if the position within the haptic signal changes abruptly, such as during a fast-forward or chapter-skip operation. The system may automatically choose as a result to apply method 20 to recover synchronization.

In another embodiment of step 104, the obtaining the fingerprint comprises retrieving the coded identifier for the fingerprint of the portion of the media signal at the identified time position directly from the haptic signal.

In step 112, the haptic signal synchronized with the media signal using the identified time position of the media content for controlling the motion feedback system is outputted according to the result of the determining if the haptic signal is synchronized with the media signal (step 110).

Figure 4:
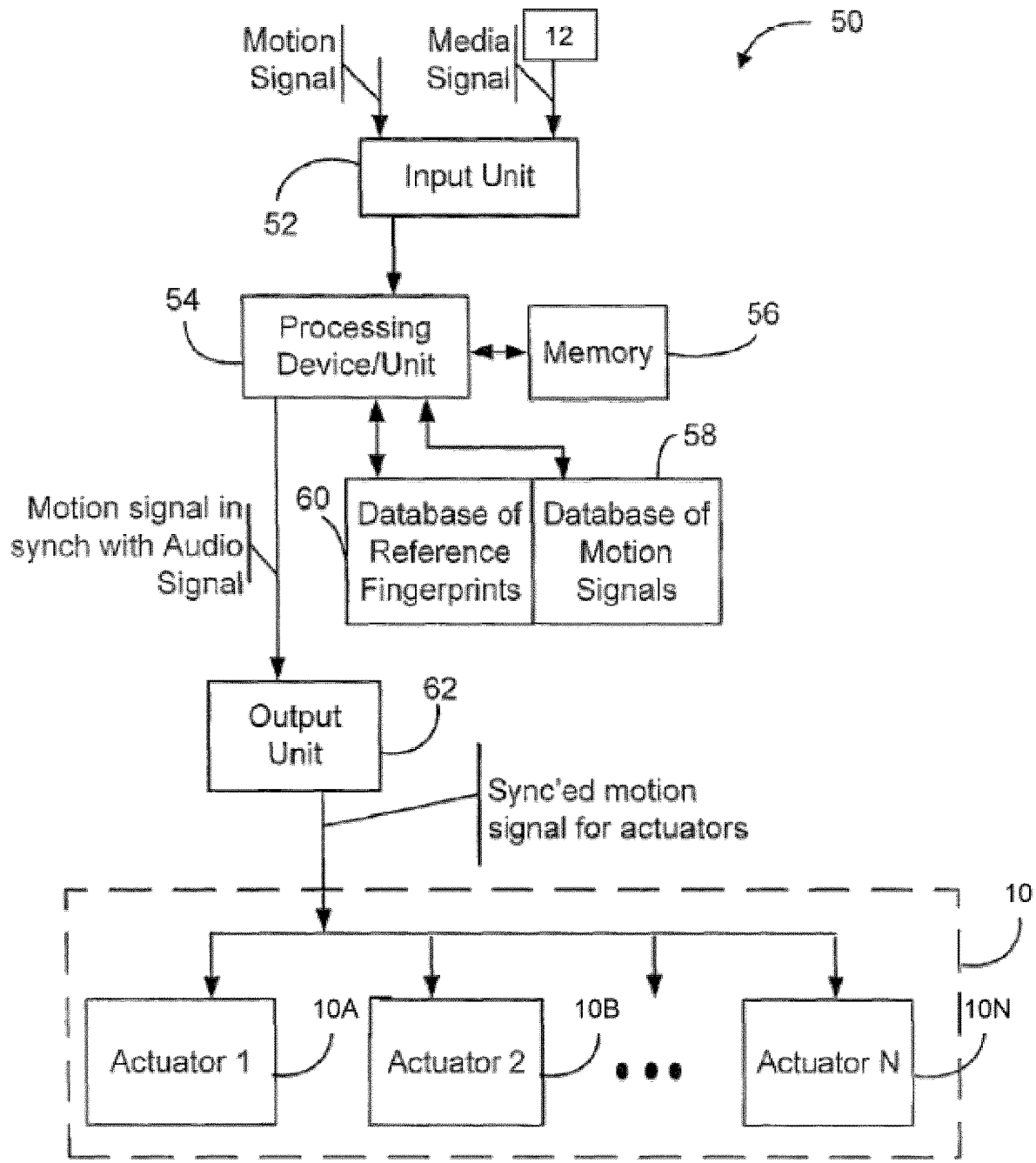
FIG. 4 is a schematic illustration of the system for synchronizing a haptic signal to an audio signal, in accordance with an embodiment.

Now referring to FIG. 4, there is shown an embodiment of a device 50 for synchronizing a haptic signal for a feature length movie with a media signal. The device 50 is configured for implementing at least some of the steps of the methods 20 and 100. The device 50 has an input unit 52; a processing unit 54; a memory 56; one or more databases (here databases 58 and 60); and an output unit 62 in communication with the motion feedback system 10 having actuators 1 to N, 10A to 10N.

The input unit 52 is for receiving a portion of a media signal. The input unit 52 may thus receive the captured audio from the microphone(s) 12, or other capture device used, including line in, optical devices, inertial sensors, etc.

The databases 58 and 60 are used respectively for storing haptic signals, reference media signal fingerprints and/or metadata tracks in association with particular known media content (e.g., a known feature length movie). The databases 58 and 60 may be within the device 50, cloud-based, on dedicated servers, etc and may be accessible in any appropriate way. Such reference fingerprints are identifiers already derived for the known media content, and which are known to be uniquely related to the known media content. Additional information may be correlated to the reference fingerprints, including the metadata track for the media content.

The processing unit 54 is in communication with the input unit 52 and the databases 58 and 60, as well as with the memory 56. The memory 56 is thus accessible by the processing unit 54, and may be a non-transitory computer-readable memory communicatively coupled to the processing unit 54 and comprising computer-readable program instructions executable by the processing unit 54 to perform some of the steps of methods 20 and 100. In one embodiment, the memory 56 is used to store instructions for implementing the processing unit 54 to perform a series of steps on the media signal which involve access and retrieval of data from the databases 58 and 60, as well as processing steps allowing the synchronization of a haptic signal with the media signal as in methods 20 and 100, including the audio processing. The processing unit 54 is also in communication with the output unit 62 such that the haptic signal, once retrieved and synchronized, are sent out either for storage on a database (not shown), or directly to a motion feedback system 10 during playback of the media signal. Although the processing unit 54 is shown to be local in the illustrated embodiment, the processing unit(s) may be remote in some other embodiments. For example, the processing unit can be provided in the form of one or more virtual machines accessible via one or more networks such as the Internet. It is noted that such remote processing may advantageously reduce the computational power requirements on any local processing unit, and/or also facilitate software, firmware and/or hardware updates that may be required over time.

Once the portion of the media signal is received at the processing unit 54, via its transmission from the input unit 52, the processing unit 54 obtains a fingerprint corresponding to the received portion of the media signal.

The processing unit 54 then proceeds to identify, from reference fingerprints associated with time positions of at least one reference media content, a time position of the media content corresponding to the obtained fingerprint. For example, to perform such comparison, the processing unit 54 accesses the database 60 of reference fingerprints; parses them via optional retrieval of data to an optional internal memory (not shown) until a match is detected between a reference media signal fingerprint and the fingerprint of the media signal. When no match is detected, an error signal is sent out to a user interface (not shown).

The processing device 54 may also process the captured audio for calibration purposes, as mentioned in steps 24 and 104 above. The processing device 54 continuously obtains the haptic signal associated with the identified time position of the media content. When synchronization is reached, the processing device 54 knows the identity of the media content and the time stamp corresponding to instantaneous playback. As the synchronization is maintained, the processing device 54 compares the received sound level to what should be as per the metadata track to have optimal timing by looking at the power track at that time stamp. If the received sound level is judged to beyond a given threshold from an optimal predetermined sound level, the audio gain of the processing device 54 is modified to approximate the optimal value.

This approach of optimizing the sound level can help to anticipate the silences in the audio of the media content to improve the robustness, and also to detect more quickly the loss of the audio track to which the motion track is synchronized. More specifically, synchronization must tolerate periods during which the audio, while present, does not make it possible to confirm the synchronization. This is the case of silences, where the processing unit 54 may not have enough audio resolution to confirm a synchronization. If the metadata track informs the processing unit 54 of a latent period during the silences, the processing unit 54 can quickly detect an absence of match between media content if it is expecting to have loud audio, and thus a loss of synchronization. When synchronization is lost, or at the end of medial content, the AGC algorithm mentioned above is resumed. Also, in some embodiments, when the synchronization is temporarily lost because of a silence period, for instance, no attempt to optimize the audio gain may be made.

Based on the identified time position of the media content, the processing device 54 is able to synchronize and output the haptic signal with the media signal. For example, to do so, the processing unit 54 retrieves and sends the haptic signal from the database 58 starting at the identified time position that corresponds to the reference time of the media signal received at input unit 52. The haptic signal which is sent at output unit 62 is therefore synchronized with the playback time position of the media signal.

According to another embodiment, there is provided a non-transitory computer readable memory (not shown) having recorded thereon statements and instructions for execution by a computer to carry out a method for synchronizing a haptic signal corresponding to a media content with a media signal for the media content. The haptic signal is for controlling a motion feedback system. The method comprises method 20 shown in FIG. 2.

Finally, according to another embodiment, there is provided a non-transitory computer readable memory (not shown) having recorded thereon statements and instructions for execution by a computer to carry out a method for determining if a haptic signal corresponding to a media content is synchronized to a media signal for the media content. The haptic signal is for controlling a motion feedback system. The method comprises method 100 shown in FIG. 3.

The audio processing and calibrating described in method 100, and as implemented by the device 50 can use the knowledge of the audio track achieved via the identification of the media content, to make a more robust fingerprint generation, to achieve more effective synchronizing. Therefore, this may result in a quicker detection of loss of synchronization when the audio stops, or the media content changes.

Figure 5A:
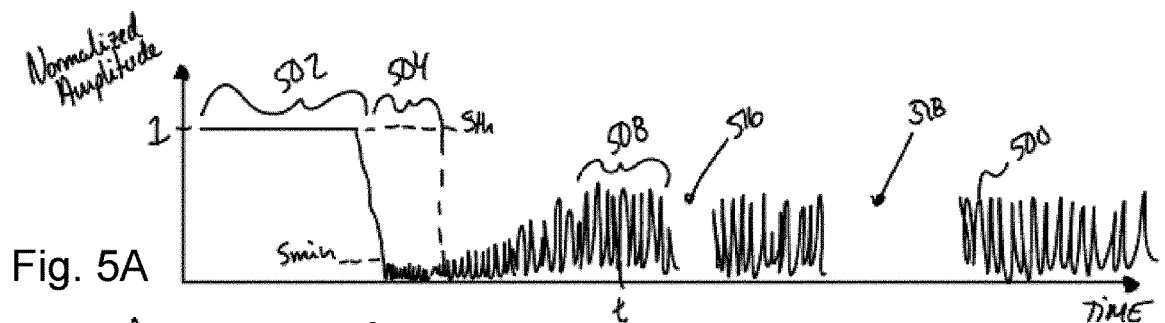
FIG. 5A is a graph showing an example of an audio portion of a given media content captured using a microphone, in accordance with an embodiment.
Figure 5B:
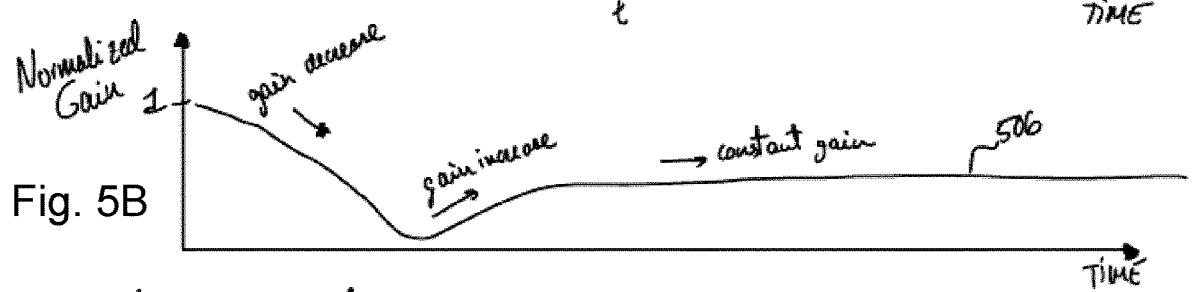
FIG. 5B is a graph showing audio gain applied to the audio portion of FIG. 5A, in accordance with an embodiment.

Different ways of achieving satisfactory detection of loss of synchronization can be implemented. For instance, FIG. 5A shows an example of an audio portion 500 captured using a microphone. In this specific embodiment, the captured audio portion 500 is modified on-the-go with a gain control module. As depicted, the gain control module can apply an audio gain to the captured audio portion 500 when it is determined that the peak amplitude of the captured audio portion 500 is unsatisfactory. For instance, at region 502, the peak amplitude of the captured audio portion 500 is determined to be above a saturation threshold Sth which can indicate that the microphone is saturated. Accordingly, the gain control module gradually reduces the audio gain throughout region 502. In this embodiment, the audio gain is reduced a bit too much, as the peak amplitude of the captured audio portion 500 tanks below a detectable sound threshold Smin. As a response, the gain control module gradually increases the audio gain throughout region 504 until the peak amplitude of the captured audio portion 500 reaches a satisfactory level. For a remainder of the captured audio portion 500, the audio gain as applied by the gain control module remains constant as the detected peak amplitude oscillates between the detectable sound threshold Smin and the saturation threshold Sth. In this embodiment, the gain control module may apply an audio gain on the captured audio portion based on a detected instantaneous peak amplitude. However, in some other embodiments, the gain control module can apply an audio gain on the captured audio portion based on a peak amplitude of an envelope of the captured audio portion 500. FIG. 5B shows a gain evolution curve 506 corresponding to the evolution of the gain applied on the captured audio portion 500 by the gain control module. In some embodiments, the gain evolution curve 506 can be associated with a given media content to be saved as part of a metadata track for later use, for instance. It is noted that although the peak amplitude of the captured audio signal is considered by the gain control module in this embodiment, other types of amplitudes such as the average amplitude, the RMS amplitude and the like can be considered by the gain control module in some other embodiments.

Figure 5C:
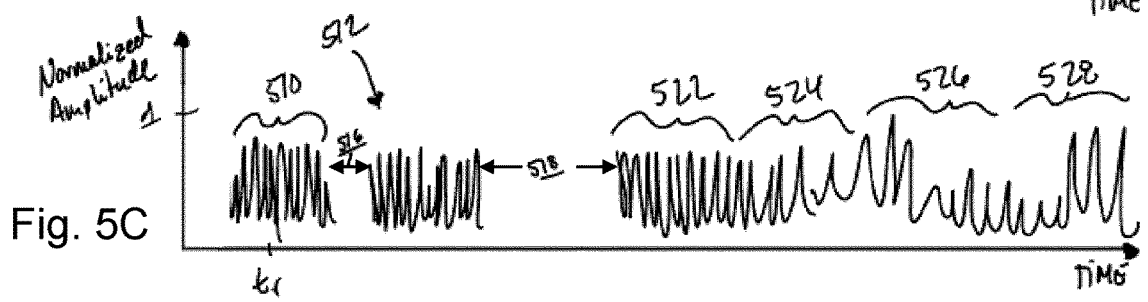
FIG. 5C is a graph showing an example of a reference audio track of the given media content, in accordance with an embodiment.
Figure 5D:
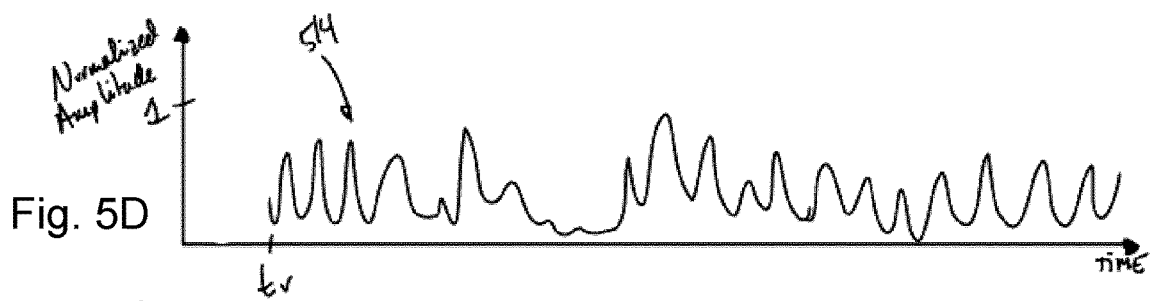
FIG. 5D is a graph showing an example of a viewer-effect signal associated with the given media content, in accordance with an embodiment.

Referring back to FIG. 5A, once the peak amplitude of the captured audio portion 500 is determined to be satisfactory, a fingerprint 508 of the captured audio portion 500 may be obtained. The obtained fingerprint 508 can differ from one embodiment to another. As discussed above with reference to method 20, the obtained fingerprint 508 is compared to a plurality of reference fingerprints to find a matching reference fingerprint. The reference fingerprints can be stored on a remote memory accessible via a network such as the Internet, for instance. In this specific embodiment, the matching reference fingerprint 510 is shown in FIG. 5C. As illustrated, the matching reference fingerprint 510 is part of an audio track 512 of a corresponding media content. As shown, the reference time position tr of the reference fingerprint 510 is identified. The reference time position can correspond to a start time position, a middle time position and/or an end time position of the corresponding fingerprint. This matching allows a viewer-effect signal 514 to be fetched, the viewer-effect signal 514 being associated with the corresponding media content, as shown in FIG. 5D, which can be used to produce a viewer effect to a viewer, such as a motion track. More specifically, the viewer-effect signal 514 associated with the identified time position tr is outputted to a viewer-effect producing device which will produce an effect for a viewer based on the outputted viewer-effect signal thereby outputting a viewer-effect signal that is synchronized with the captured audio portion 500.

Once synchronization is achieved, method 100 can be iteratively performed to ensure that the viewer-effect signal remains synchronized with the captured audio portion over time. If method 100 confirms the synchronization, the viewer-effect signal synchronized with the captured audio portion 500 continues to be outputted to the viewer-effect producing device. If method 100 finds a loss of synchronization, the viewer-effect signal may be stopped thereby stopping any effect produced to a viewer via the viewer-effect producing device. In this case, method 20 is immediately initiated in an aim to return to a synchronized status in rapidly. In some embodiments, a fingerprint obtained from a captured audio portion may be matched to a reference fingerprint pertaining to the same media content but in a prior or subsequence scene. In some other embodiments, the obtained fingerprint may be matched to a different media content.

It is noted that the method 100 can comprise different sets of steps to ensure that a loss of synchronization is independent from a quality of the captured audio portion. Indeed, in some embodiments, a fingerprint of a recently captured audio portion may fail to be matched to reference fingerprints of the corresponding media content if, for instance, i) the microphone has picked up a significant amount of surrounding sound, ii) the volume of the audio-visual set-up has been changed thereby creating a lag in the adjustment of the gain control module, iii) the obtained fingerprint pertains to an uncharacteristic portion of the audio track and iv) any other sub-optimal situation. In these embodiments, it is preferable to delay the switch from method 100 to method 20, and instead continue to output the viewer-effect signal synchronized to the audio track for at least a given amount of time to ensure a certain continuity in the effect produced to the viewer(s).

As such, in some embodiments, when it is determined that the viewer-effect is no longer synchronized to the media signal, the outputting of the viewer-effect signal may be stopped. The outputting of the viewer-effect signal may be stopped immediately in some embodiments. However, in some other embodiments, the outputted viewer-effect signal can be stopped only after a given asynchronization delay. Accordingly, even if out of synchronization, the outputting of the viewer-effect signal may be maintained at least for a given time duration. In some embodiments, the asynchronization delay is a predetermined value. For instance, it may be null or range between about 1 second and about 1 minute. As further described below, in some other embodiments, the asynchronization delay may vary as a function of the audio track of the media content. In some embodiments, acceptable asynchronization delay data associated with the media content can be received. The acceptable asynchronization delay data can include acceptable asynchronization delay values associated with corresponding ones of the reference time positions of the media content. Accordingly, in these embodiments, the given asynchronization delay can be determined based on the receiving acceptable asynchronization delay data and on the current reference time position of the media content. Alternatively or additionally, synchronization confidence data associated with the media content can be received. The synchronization confidence data can include synchronization confidence values associated with corresponding ones of the reference time positions of the media content. In these embodiments, the given asynchronization delay may be determined on the basis of the synchronization confidence data and on the current reference time position of the media content. The acceptable asynchronization delay data and the synchronization confidence data may be part of a metadata track associated with the media content.

In some embodiments, loss of synchronization can be avoided by anticipating silences such as shown at regions 516 and 518 of the audio track 512. Indeed, if the audio track 512 of the media content is known, any silences or audio level drops can be taken into account. For instance, these silences or audio level drops can be taken into account in the audio gain determination, in which case the audio gain may be maintained through the region 516 and 518 to avoid unnecessary audio gain increases. More specifically, during these silences, the audio gain may not be increased even though the detected peak amplitude is below the detectable sound threshold Sth. Accordingly, satisfactory synchronization between the viewer-effect signal 514 and the audio track 512 may be assumed until the end of any expected silences.

Figure 5E:
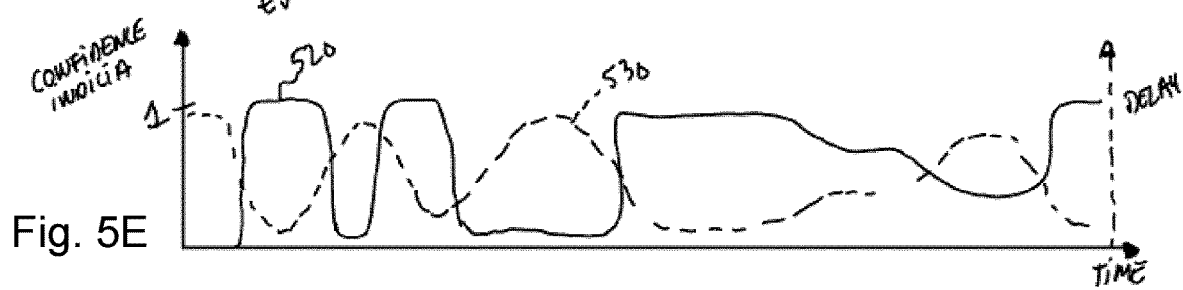
FIG. 5E is a graph showing exemplary metadata track content in the form of a synchronization confidence delay track and an acceptable asynchronization delay track for the given media content, in accordance with an embodiment.

In some embodiments, loss of synchronization can be avoided by using a metadata track associated with a given media content. For instance, FIG. 5E shows exemplary content of a metadata track, having as an example synchronization confidence curve or track 520 associated with the media content of FIG. 5C. In this embodiment, the synchronization confidence curve 520 discriminates portions of the audio track 512 that are expected to be more easily recognizable, namely characteristic portions of the audio track 512, from portions of the audio track 512 expected to be less easily recognizable or uncharacteristic. For instance, characteristic portions of the audio track 512, which may include, but not limited to, a car chase 522, music 524 and the like, can be more easily matched to corresponding reference fingerprints. In contrast, uncharacteristic portions of the audio track 512, which may include silences 516 and 518, conversation 526 regardless of its language track, rain 528 and other types of white noise, may be less easily matched to corresponding reference fingerprints. For example, the synchronization confidence curve 520 of the metadata track can tend towards unity where it is expected that the corresponding audio track is associated with a characteristic portion, whereas the synchronization confidence curve 520 can tend towards zero where it is expected that the corresponding audio track is associated with an uncharacteristic portion, or vice versa. In some embodiments, the synchronization confidence curve 520 is useful as a lack of synchronization detected on the basis of a fingerprint obtained within a characteristic portion of the audio track may lead to an instantaneous stopping of the viewer-effect signal. Indeed, if a given fingerprint is matched to a corresponding reference fingerprint within a significant confidence according to the synchronization confidence curve 520, and that the method 100 fails to do so, it may be indicative that the captured audio portion no longer corresponds to the expected media content, in which case the producing of the viewer effect should be stopped. However, if a lack of synchronization is detected with method 100 as the fingerprint is supposed to show a conversation regardless of its language track at that identified time position, the viewer-effect signal may be maintained for a given period of time until an actual loss of synchronization is detected during a more characteristic portion of the audio track, for instance. In some embodiments, the synchronization confidence curve 520 may be modified on the go when it is determined that the captured audio portion is of poor quality. For instance if the gain control module is in the process of modifying the audio gain to obtain a satisfactory sound level, any loss of synchronization detected during this period may be of lower confidence.

In some embodiments, the metadata track can also include an asynchronization tolerance curve or track 530. For instance, if a loss of synchronization is detected within a characteristic portion of the audio track, the asynchronization tolerance delay that is tolerated by the method 100 can be shorter than when a loss of synchronization is detected during an uncharacteristic portion of the audio track. As such, the asynchronization tolerance delay can be particularly useful in cases where the captured audio signal is poor or during prolonged silences. It is noted that the synchronization confidence curve 520 and the asynchronization tolerance curve 530 are shown in the form of respective curves in this embodiment. However, in some other embodiments, the information carried by these curves may be provided in any other suitable shape or form, such as in a table and the like. Such metadata track(s) may be useful as it may provide a smoother rendering of the viewer-effect signal over time.

In some embodiments, characteristic and uncharacteristic portions of an audio track may be determined by a trained user listening to the audio track and annotating each portion thereof in real-time using an appropriate software. However, in some other embodiments, characteristic and uncharacteristic portions of an audio track may be determined using a trained machine learning module which may classify each portion of an audio track. For instance, such machine learning module may be trained using previously annotated audio tracks. In some alternate embodiments, the probability of identifying a recognizable fingerprint is measured as a function of the signal-to-noise ratio in an audio track, which may be used as a basis for determining a corresponding synchronization confidence track.

Figure 6A:
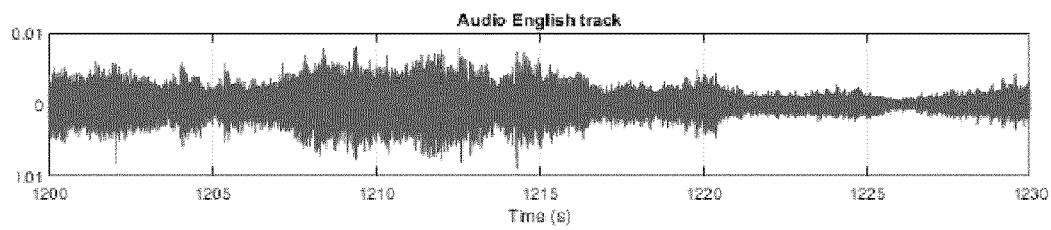
FIG. 6A is a graph showing an example of an English version of an audio track of a given media content, in accordance with an embodiment.
Figure 6B:
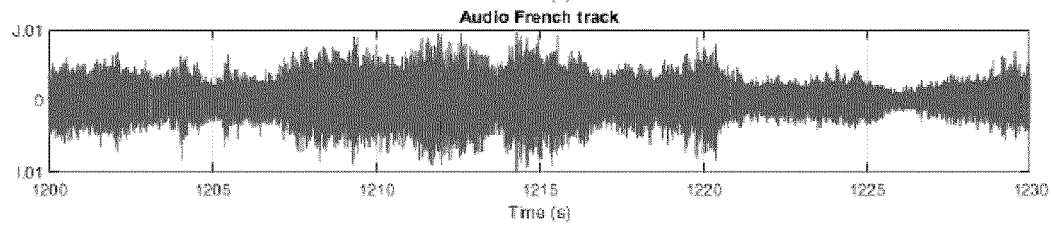
FIG. 6B is a graph showing an example of a French version of the audio track of the given media content, in accordance with an embodiment.
Figure 6C:
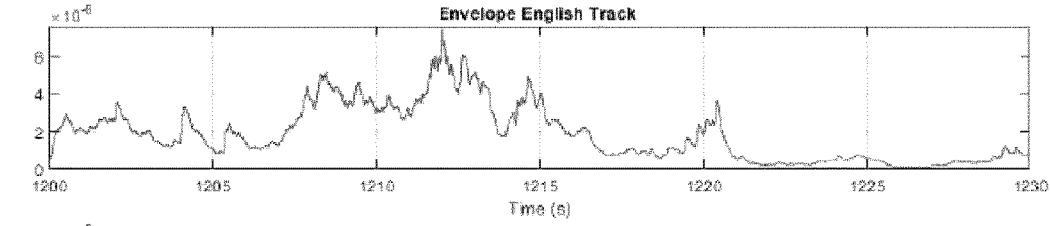
FIG. 6C is a graph showing an example envelope for the English version of the audio track of FIG. 6A, in accordance with an embodiment.
Figure 6D:
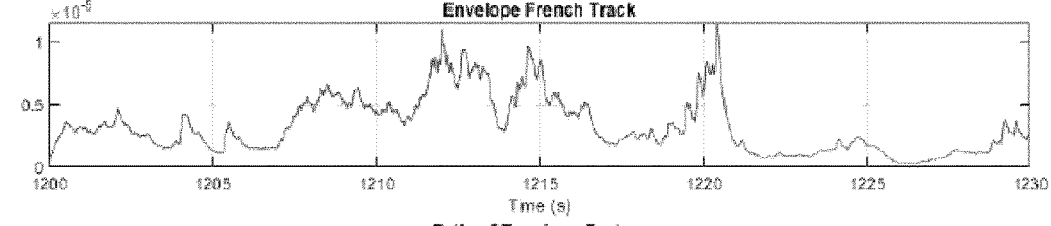
FIG. 6D is a graph showing an example envelope for the French version of the audio track of FIG. 6B, in accordance with an embodiment.
Figure 6E:
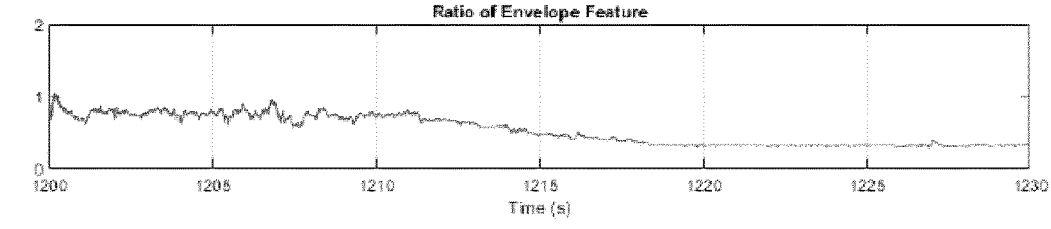
FIG. 6E is a graph showing a ratio of the envelopes of FIGS. 6C and 6D, in accordance with an embodiment.

In the above example, conversations such as conversation 526, including voices, may be assumed to be a less easily recognizable portion of the audio track as the language of the audio track may differ from a default language. For instance, FIGS. 6A and 6C show the instantaneous peak amplitude variation and the envelope variation of an English version of an audio track whereas FIGS. 6B and 6D show the instantaneous peak amplitude variation and the envelope variation of a French version of the same audio track. As best shown in FIG. 6E, which shows a ratio of the envelope variations of the English and French versions of the audio track, one can notice that fingerprint or feature differences are relatively insignificant between the English and French versions of the audio track at a corresponding time position. Accordingly, the envelope variation of the corresponding audio track may be preferably used for audio gain control purposes. In some embodiments, the instantaneous peak amplitude variation of the audio track is the preferred track for synchronization determination. For instance, if method 100 is performed during a conversation, or where differences are observed between the English and French versions of the audio track, the confidence with which a loss of synchronization is obtained may be on the lower side, which may cause the outputting of the viewer-effect signal synchronized with the audio track to be maintained for a given amount of time. For instance, the outputting may be maintained until a loss of synchronization is obtained during a portion of the audio track which is not expected to vary significantly from one language to another.

In some embodiments, method 100 is performed during conversations however any loss of synchronization obtained during these conversations may be overlooked, thereby continuing to output the viewer-effect signal synchronized to the audio track. In some embodiments, performing the method 20 may identify a given media content and corresponding audio track. It is noted that while performing method 100, and more specifically during the comparison step between the obtained fingerprint and the reference fingerprints of the corresponding audio track, the method may include a step of confirming that the captured audio portion pertains to the default language track. In some embodiments, some differences between the obtained fingerprint and the reference fingerprints may be indicative that the audio track is not in the default language. In such embodiments, the method may include a step of finding the right language track associated with the audio track, and substituting from the default language track for the right language track, if these differences can be minimized or else if a match with reference fingerprints pertaining to a different language track can be found. For instance, in some embodiments, a correlation may be performed between the obtained fingerprint and reference fingerprints of different language tracks associated with a same media content. In these embodiments, the right language track may be identified based on the correlation results and/or on the basis of the synchronization confidence data.

While embodiments have been described above and illustrated in the accompanying drawings, it will be evident to those skilled in the art that modifications may be made therein without departing from the scope of this disclosure. For instance, although a microphone is used to capture an audio portion of a media content, it is intended that the microphone can be removed and replaced by a camera capturing an image portion of the media content. In these embodiments, a visual fingerprint may be matched to reference visual fingerprints including, but not limited to, watermarks, timestamps or movie IDS in streaming media or any other type of media. Such modifications are considered as possible variants comprised in the scope of the disclosure.

The invention claimed is:

1. A system for synchronizing a viewer-effect signal of a media content with a media signal of the media content, the system comprising:
   at least one microphone capturing an audio portion of the media signal from a surrounding environment;
   a controller communicatively coupled to the at least one microphone, the controller having a processor and a non-transitory memory having stored thereon instructions that when executed by the processor perform the steps of:
      applying a given gain to the captured audio portion for the captured audio portion to be within a threshold associated with the at least one microphone;
      obtaining a fingerprint from the captured audio portion of the media signal after applying the given gain;
      from reference fingerprints associated with reference time positions of a reference media content, identifying a time position of the media content corresponding to the obtained fingerprint;
      obtaining the viewer-effect signal associated with the identified time position of the media content; and
      outputting the viewer-effect signal synchronized with the media signal using the identified time position of the media content usable for producing an effect for a viewer synchronized with the media signal.

2. The system of claim 1 wherein the at least one microphone is made integral to a viewer seat.

3. The system of claim 1 wherein the at least one microphone includes a plurality of microphones capturing different audio portions of the media signal.

4. The system of claim 3 wherein the plurality of microphones are distributed within the surrounding environment.

5. The system of claim 3 wherein the steps of obtaining, identifying and obtaining are performed for each of the captured audio portions of the media signal.

6. The system of claim 1 wherein the reference fingerprints are stored on a remote database and accessible by the controller during the identifying.

7. The system of claim 1 wherein the obtaining the viewer-effect signal comprises retrieving the viewer-effect signal from the remote database.

8. The system of claim 1 wherein the given gain is applied to the captured audio portion prior to the identifying, the given gain being based on a metadata track created for the media signal, the metadata track associating expected audio intensity values to corresponding time intervals of the media signal.

9. The system of claim 8 wherein, for a given time interval of the media signal, the given gain is reduced when a peak amplitude of the captured audio portion is above the corresponding expected audio intensity value of the given time interval, the given gain is increased when the peak amplitude is below the corresponding expected audio intensity value of the given time interval, and the given gain is maintained when the peak amplitude is equal, within a given tolerance, to the corresponding expected audio intensity value of the given time interval.

10. The system of claim 1, further including a viewer-effect producing device communicatively coupled to the controller, the viewer-effect producing device producing an effect for a viewer based on the outputted viewer-effect signal synchronized with the media signal.

11. The system of claim 10 wherein the viewer-effect producing device is a motion feedback device, the viewer-effect signal corresponding to a haptic signal.

12. A system for determining if a viewer-effect signal of a media content is synchronized to a media signal of the media content, the system comprising:
   a viewer-effect producing device producing an effect for a viewer based on the viewer-effect signal;
   at least one microphone capturing an audio portion of the media signal from a surrounding environment; and
   a controller communicatively coupled to the viewer-effect producing device and the at least one microphone, the controller having a processor and a non-transitory memory having stored thereon instructions that when executed by the processor perform the steps of:
      using a gain control module, applying a given gain to the captured audio portion for the captured audio portion to be within a threshold associated with the at least one microphone;
      obtaining a fingerprint of the captured audio portion of the media signal after applying the given gain;
      retrieving a reference fingerprint of the media signal at a reference time position of the media content based on a current time position of the viewer-effect signal;
      comparing the obtained fingerprint and the reference fingerprint to one another;
      based on the comparing, determining if the viewer-effect signal is synchronized to the media signal; and
      according to the determining, outputting the viewer-effect signal synchronized with the media signal for producing the effect in synchronization with the media content using the viewer-effect producing device.

13. The system of claim 12 further comprising, upon determining that the viewer-effect signal is not synchronized to the media signal, stopping the outputting the viewer-effect signal.

14. The system of claim 13 further comprising, prior to the stopping, maintaining the outputting for a given asynchronization delay.

15. The system of claim 14 further comprising receiving acceptable asynchronization delay data associated to the media content, the acceptable asynchronization delay data including a plurality of acceptable asynchronization delay values associated with corresponding ones of the reference time positions of the media content, and determining the given asynchronization delay based on the receiving acceptable asynchronization delay data and the reference time position of the media content.

16. The system of claim 14 further comprising receiving synchronization confidence data associated to the media content, the synchronization confidence data including where plurality of synchronization confidence values associated with corresponding ones of the reference time positions of the media content, and determining the given asynchronization delay based on the synchronization confidence data and the reference time position of the media content.

17. The system of claim 12 wherein the at least one microphone is made integral to a viewer seat.

18. The system of claim 12 wherein the given gain is applied to the captured audio portion prior to the obtaining, the given gain being based on a metadata track created for the media signal, the metadata track associating expected audio intensity values to corresponding time intervals of the media signal.

19. The system of claim 12, further including a viewer-effect producing device communicatively coupled to the controller, the viewer-effect producing device producing an effect for a viewer based on the outputted viewer-effect signal synchronized with the media signal.

20. The system of claim 19 wherein the viewer-effect producing device is a motion feedback device, the viewer-effect signal corresponding to a haptic signal.

\* \* \* \* \*